United States Patent [19]

Shirai

[11] 4,227,600
[45] Oct. 14, 1980

[54] ELECTROMAGNETIC CLUTCHES

[75] Inventor: Isamu Shirai, Isesaki, Japan

[73] Assignee: Sankyo Electric Company Limited, Isesaki, Japan

[21] Appl. No.: 952,545

[22] Filed: Oct. 18, 1978

[30] Foreign Application Priority Data

Oct. 18, 1977 [JP] Japan .................. 52-139592
Oct. 18, 1977 [JP] Japan .................. 52-139593
Oct. 18, 1977 [JP] Japan .................. 52-139594

[51] Int. Cl.$^3$ .............................................. F16D 27/10
[52] U.S. Cl. ...................................................... 192/84 C
[58] Field of Search ................ 192/84 R, 84 A, 84 C

[56] References Cited

U.S. PATENT DOCUMENTS

| | | | |
|---|---|---|---|
| 3,044,594 | 7/1962 | Bernard | 192/84 C |
| 3,082,933 | 3/1963 | Bernard | 192/84 C X |
| 3,530,416 | 9/1970 | Klinkenberg | 192/84 C X |
| 4,069,572 | 1/1978 | Pierce et al. | 192/84 C X |

*Primary Examiner*—Allan D. Herrmann
*Attorney, Agent, or Firm*—Hopgood, Calimafde, Kalil, Blaustein & Lieberman

[57] ABSTRACT

An annular armature plate of an electromagnetic clutch is provided with circular grooves in an axial end surface corresponding to the location of concentric slits of a cooperating clutch element made of a magnetic materials to define magnetic pole pieces. The armature plate further includes corresponding press-formed circular projections on the opposite end surface thereof, in order to strengthen the magnetic attraction between the armature plate and the cooperating clutch element. The armature plate may be supported on and joined to a rotatable member by leaf springs and may be provided with pin-like projections formed on the axial end surface thereof to fix the leaf springs to the armature plate. A radial flange of the rotatable member supporting the armature plate may be provided with projections with flat end surfaces on which the leaf springs are fixed without the use of washers.

6 Claims, 10 Drawing Figures

ELECTROMAGNETIC CLUTCHES

BACKGROUND OF THE INVENTION

This invention relates generally to electromagnetic clutches, such as for use in controlling the transmission of an automobile engine output to a refrigerant compressor in an automobile air-conditioning refrigerating system, and, in particular to an improved amature structure for an electromagnetic clutch.

U.S. Pat. Nos. 3,044,594 and 3,082,933 disclose electromagnetic clutches which are used between an automobile engine and the compressor. The shown electromagnetic clutch dislcosed in these patents comprises a pulley mounted on a bearing which is, in turn, mounted on a tubular extension of a compressor housing and which is rotated by a belt from the automobile engine. The pulley is provided with an axial end plate of a magnetic material in which one or more concentric arcuate or annular slits are formed to define a plurality of concentric annular magnetic pole pieces. A drive shaft of the compressor extends through the tubular extension. A hub is fixed to the extending terminal end of the drive shaft, and an annular armature plate is joined by leaf springs to the hub in such a fashion that the armature plate faces the annular concentric pole pieces with an axial air gap therebetween. A magnetic coil is mounted on the tubular extension to supply magnetic flux for attraction of the armature plate to the magnetic pole pieces.

Thus, when the magnetic coil is energized, the drive shaft is rotated together with the pulley by the engine output, and when the magnetic coil is not energized, the pulley is rotated by the engine but the compressor is not driven.

In the conventional electromagnetic clutch, one or more annular grooves are formed in the surface of the armature opposite to the magnatic pole pieces corresponding to one or more concentric circles on which the slits are disposed, in order to strengthen the magnetic attraction force between the magnetic pole pieces and the armature.

However the formation of grooves in the armature surface increases the magnetic resistance of the armature, which causes a reduction in the magnetic attraction force between the armature plate and the magnetic pole pieces. Therefore, the armature must be made of thicker magnetic plate in order to secure the advantage of the formation of the grooves, thereby increasing the weight of the armature plate and, therefore, the electromagnetic clutch.

Moreover, leaf springs for joining the armature plate to the hub are conventionally fixed to the armature plate by rivets, which requires the formation of holes in the armature plate. In addition, a considerable amount of time is required for the fixing operation by the use of rivets.

Furthermore, in fixing the leaf springs to the hub, washers are conventionally used between the leaf springs and the hub to prevent the leaf springs from coming into contact with the peripheral edge of the hub at a time when the armature is attracted to the magnetic pole pieces of the pulley. But the use of washers complicates the fixing of the leaf springs to the hub.

SUMMARY OF THE INVENTION

It is an object of this invention to provide an electromagnetic clutch which is relatively easy to fabricate, low in cost, light in weight, and excellent in performance.

It is another object of this invention to provide an electromagnetic clutch wherein the magnetic attraction force between an armature plate and a cooperating magnetic clutch element is strengthened without an increase in the thickness and weight of the armature plate.

It is still another object of this invention to provide an electromagnetic clutch wherein the leaf springs which join the armature plate to the hub are fixed to the armature plate by a simple fixing operation.

It is yet another object of this invention to provide an electromagnetic clutch wherein no washer is used between the hub and the leaf springs fixed thereon.

According to this invention, the armature plate is provided with one or more press-formed annular grooves in the surface of the armature plate opposite to the cooperating magnetic clutch element corresponding to one or more concentric circles on which slits formed in the element are disposed. The armature is provided with press-formed annular projections on the opposite end surface thereof corresponding to the annular grooves. The magnetic resistance of the armature plate is not reduced in spite of the provision of annular grooves so that the magnetic attraction force between the armature plate and the cooperating clutch element is reliably increased. Furthermore, since the annular grooves and projections are formed by pressing an annular plate made of a magnetic material such as steel, the production of the armature plate is facilitated.

According to another aspect of this invention, the armature plate is provided with a plurality of press-formed pin-like projections, which are respectively fitted into holes formed in the leaf springs. The leaf springs are fixed to the armature plate by press-deforming the projected ends of the pin-like projections without the use of any rivets. The pin-like projections may be formed on the annular projections of the armature plate.

According to still another aspect of this invention, the hub is provided with a plurality of press-formed projections on an axial end surface thereof, with corresponding depressions being formed in the opposite surface thereof. The projected end surface of each projection is formed flat, and a hole is formed in the projection end surface in communication with the corresponding depression. The leaf springs are fixed on respective projections by rivets placed through the holes without the use of washers.

Further objects, features and other aspects of this invention will be understood from the following detailed description of preferred embodiments of this invention referring to the annexed drawings.

BRIEF DESCRIPTION OF THE DRAWINGS

FIG. 3 is a cross-sectional view as viewed along a line III—III in FIG. 2a;

FIG. 4 is a cross-sectional view as viewed along a line IV—IV in FIG. 2a;

FIG. 6b is a cross-sectional view of the armature plate and the leaf spring associated thereto according to the embodiment shown in FIG. 6a.

DETAILED DESCRIPTION OF PREFERRED EMBODIMENTS

Figure 1:
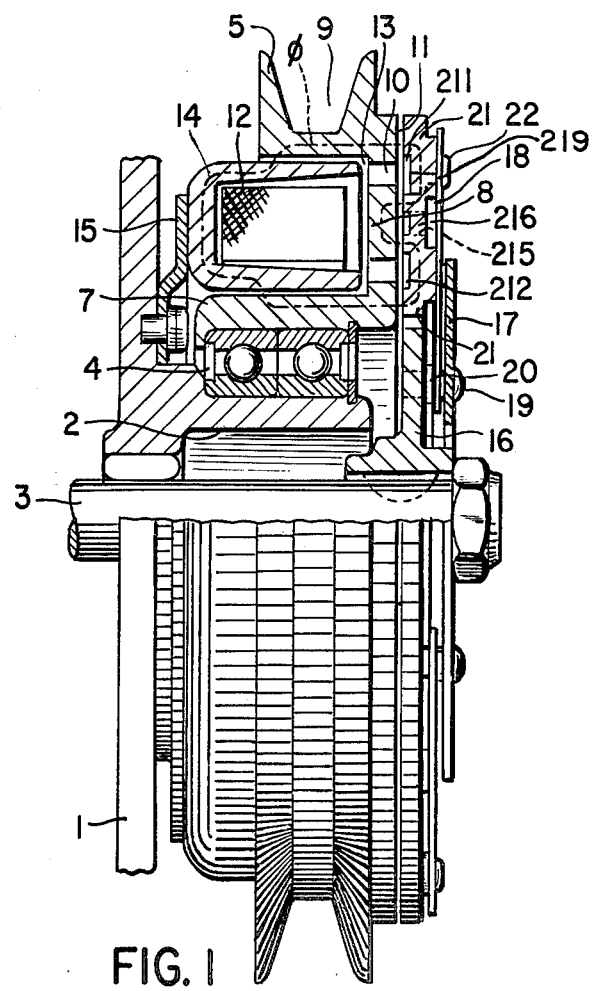
FIG. 1 is a side elevation of an electromagnetic clutch according to an embodiment of this invention, with the upper half portion of the clutch shown as a sectional view.
Figure 2A:
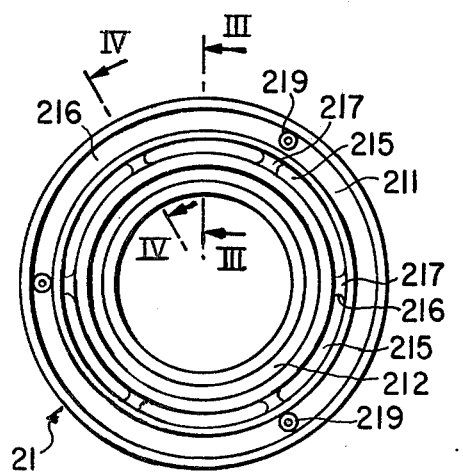
FIG. 2a–2c are respectively rear, side and front views of the armature plate in FIG. 1.
Figure 2B:
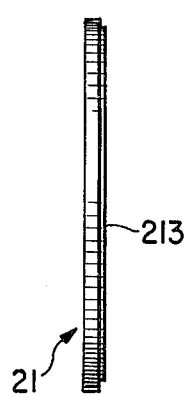
Figure 2C:
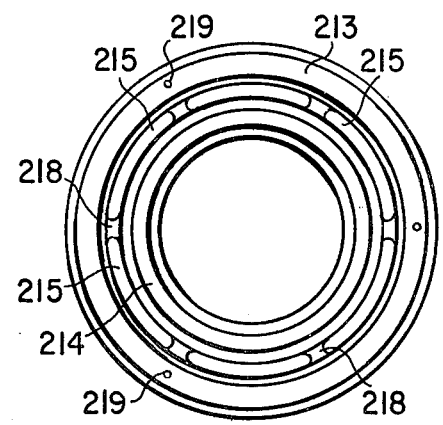
Figure 3:
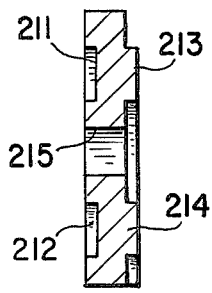
Figure 4:
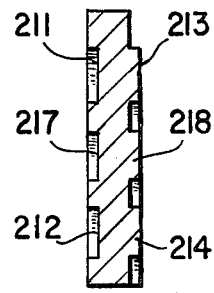

Referring to FIGS. 1-4, which illustrate an electromagnetic clutch according to an embodiment of this invention, the clutch is assembled on an automobile compressor for a automobile air conditioning and refrigerating system. The compressor housing 1 is provided with a cantilevered tubular extension 2 surrounding an extension 3 of the drive shaft of the compressor. The drive shaft is rotatably supported in the compressor housing wall by a bearing.

Ball bearings are mounted on the tubular extension. A pulley 5 made of a magnetic material such as, steel and comprises an outer annular cylindrical portion 6, an inner annular cylindrical portion 7, and an axial end plate portion 8 connecting between the outer and inner cylindrical portions at an axial forward end.

An annular V-shaped groove is provided on the outer peripheral surface of the outer cylindrical portion 6, of the pulley for receiving a V-belt for coupling the compressor to the output shaft of an automobile engine (not shown).

The axial end plate portion 8 includes one or more concentric slits 10 which are disposed on one or more concentric circles (slits 10 are shown as being disposed on two concentric circles), so that a plurality of annular or arcuate magnetic pole pieces are defined, with the pole piece surface being on the axial end surface 11 of the axial end plate portion 8.

An electromagnetic annular coil 12 is disposed in an annular space 13 defined by the inner and outer cylindrical portions 6 and 7 and the axial end plate portion 8.

The coil 12 is contained within an annular magnetic housing 14 having a U-shaped cross section. The housing 14 is fixed to a supporting plate 15, which is secured to the compressor housing 1, so that the coil housing 14 is maintained within a space 13 out of contact with the pulley 5 but with a small gap.

The shaft extension 3 has a hub or radial flange 16, which is secured to an extending terminal end of the shaft extension. An annular stopper plate 17 and leaf springs 18 are secured by rivets 19 on an axial end surface of the hub 16 with washers 20 being disposed between the hub and the leaf springs.

The leaf springs 18 generally radially extend and support an annular armature plate 21 made of magnetic material such as steel, at extending ends thereof.

Referring to FIGS. 2a, 2b, 2c, 3 and 4 in addition to FIG. 1, it can be seen that the armature plate 21 is provided with two concentric annular grooves 211 and 212 in the end surface thereof in opposition to the axial end plate portion 8 and corresponding to the plurality of concentric slits 10 formed on the axial end plate portion 8 and disposed on two concentric circles. The concentric annular grooves 211 and 212 of the armature plate are formed by a pressing method such as a fine blanking press, so that the armature plate 21 is provided with two concentric annular projections 213 and 214 on the opposite surface thereof corresponding to the annular grooves.

The armature plate 21 is also provided with a plurality of concentric arcuate slits 215 which extend between the two concentric annular grooves on an imaginary circle, with a radial connecting portion 216 remaining between each of the adjacent slits 215.

The radial connecting portion 216 is also depressed by pressing from the side facing the axial end plate to form depressions 217 in the portion 216 so that the armature plate is also provided with corresponding projections 218 on the opposite surface thereof.

A plurality of holes 219 are formed in the outer annular projection 213 at angularly spaced positions to extend to the corresponding annular groove 211. A hole at an end portion of each leaf spring 18 is registered to each hole 219, and a rivet 22 is inserted through both holes to fix the leaf spring to the armature plate 21.

In this arrangement, the magnetic flux generated by the magnetic coil 12 flows, as shown by the broken line loop in FIG. 1, through housing 14, outer cylindrical portion 6, end plate portion 8, armature plate 21, end plate portion 8, inner cylindrical portion 7, and housing 14, so that the armature plate 21 is attracted to the end plate portion 8 to transmit the rotation of pulley 5 to the shaft 3.

Figure 5:
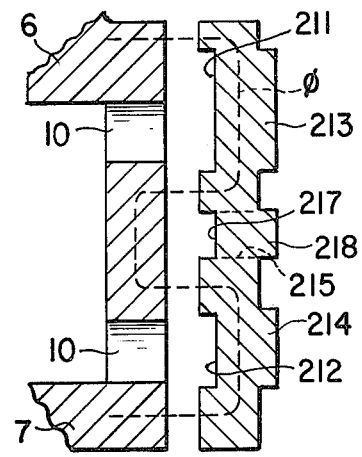
FIG. 5 is an enlarged cross-sectional view of the end plate portion and the armature plate for explaining the magnetic flux flow path.

In detail, the magnetic flux $\phi$ flows from the end plate portion 8 to the armature plate 21 due to the existence of the slits 10 of the end plate portion 8, returns to the end plate portion between slits 10 due to the existence of slits 215 of the armature plate, again flows therefrom to the armature plate 21 due to the other slits 10 of the end plate portion 8, and finally returns to the end plate portion 8, as shown in FIG. 5. Thus, the magnetic flux flows in a zig-zag path through the end plate portion 8 and the armature plate 21. In this connection, the grooves 211 and 212 and depressions 217 secure the magnetic flux to flow through not only the small surface region but also interior of the armature plate and the end plate, thereby to strengthen the magnetic attraction force between the armature plate 21 and the end plate portion 8.

Figure 6A:
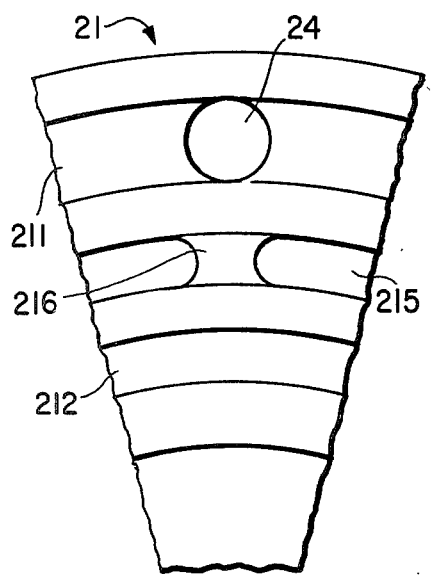
FIG. 6a is a partial rear view of the armature plate of an electromagnetic clutch according to another embodiment of this invention.

In this embodiment, since the annular grooves 211 and 212 are press-formed, corresponding annular projections 213 and 214 are formed on the opposite end so that the cross-sectional area of the magnetic path through the armature plate are not reduced in spite of the formation of the annular grooves 211 and 212. Therefore, the magnetic resistance is not increased so that the magnetic attraction force between the end plate portion 8 and the armature plate 21 is considerably strengthened, without an increase. The embodiment of the invention illustrated in FIGS. 6a and 6b, Referring to FIGS. 6a and 6b, the shown another embodiment is directed to a structure for fixing the leaf springs 18 to the armature plate 21. The armature plate 21 is provided with a plurality of pin-like projections 23 on the outer annular projections at angularly spaced positions, as shown by the imaginary line in FIG. 6b. The pin-like projections 23 are formed by pressing the armature plate from the side of the annular groove 211 such that, in the annular groove 211, corresponding depressions 24 are formed in the annular groove 211. In the actual production of the armature plate, the annular projections 213 and 214 and pin-like projections 23 may be conveniently formed by a single pressing process using a conforming punch. Alternatively, the press-forming process of the pin-like projections precede the pressing process of annular projections.

Figure 6B:
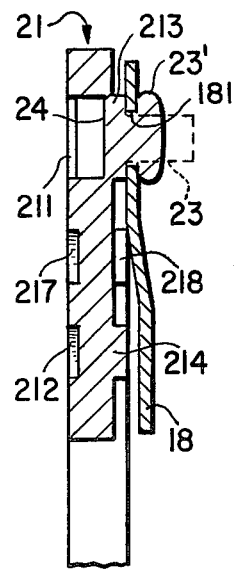

The pin-like projections 23 are fitted into the holes 181 at the end of respective leaf springs 18, and are press-formed as shown by 23' in FIG. 6b to fix the leaf springs on the annular projection 213.

Figure 7:
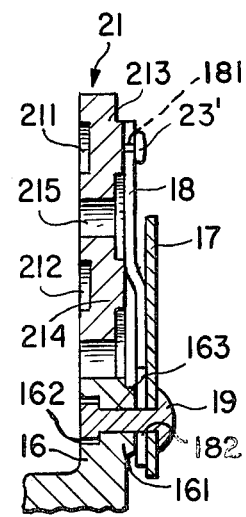
FIG. 7 is a cross-sectional view of a structure for joining the armature plate to the hub of an electromagnetic clutch according to another embodiment of this invention.

The modified construction of FIG. 7 is directed to a structure for fixing the leaf springs 18 to the hub 16 together with the stopper plate 17. The fixing structure of leaf springs of the armature plate is similar as the embodiment in FIGS. 6a and 6b.

The hub 16, which may be made of carbon steel is provided with a plurality of press-formed projections 161, which axially extend from the surface thereof. Therefore, the hub 16 is also provided with corresponding depressions 162 on the opposite surface thereof. A hole 163 is formed in each projection 161 extending to the corresponding depression 162. The projected end surface of each projection 161 is formed flat. Each of the leaf springs 18 is ridden on the projections 18 in such a fashion that a hole 182 at the radial inner end on the leaf spring 18 is registered with the hole 163 of the projection 161. The stopper plate 17 is put on the leaf springs, and is fixedly secured by rivets 19 together with leaf springs 18 to the hub 16, which extend through holes formed in the stopper plate, the holes of the leaf springs and the holes of the hub 16.

In this arrangement, the projections 161 serve as washers (shown by 20 in FIG. 1), so that no washer is necessary, thereby simplifying the fixing operation of the leaf springs and the stopper plate to the hub.

Although this invention has been described in detail in connection with several preferred embodiments, it will be understood by those skilled in the art that those embodiments are only for exemplification to which this invention is not restricted, and that various further modifications and may be made therein without departing from the scope of this invention.

What is claimed is:

1. In an electromagnetic clutch comprising a first rotatable member having an axial end plate of magnetic material, said end plate being provided with a plurality of concentric slits disposed on at least one circle, thereby to define a plurality of annular or arcuate magnetic pole pieces, a second rotatable member, a cooperating annular armature plate of magnetic material joined to said second rotatable member so as to be capable of limited axial movement, said annular armature plate facing said axial end plate of said first rotatable member with an axial gap therebetween, and electromagnetic means associated with said axial end plate for attracting said armature plate, said armature plate being provided with at least one annular groove in an axial end surface thereof facing said axial end plate and corresponding to said concentric slits and with at least one annular projection on an opposite axial end surface thereof corresponding to said annular grooves.

2. The improvement as claimed in claim 1, wherein said plurality of concentric slits of said end plate are arranged in first and second concentric circles, said armature plate being provided with first and second concentric annular grooves respectively corresponding to said first and second concentric circles and with a plurality of arcuate slits disposed on an imaginary circle concentric with and between said first and second concentric annular grooves.

3. The improvement as claimed in claim 1 or 2, further comprising flexible means for joining said annular armature plate to said second rotatable member, said axial flexible means comprising leaf springs fixedly secured to said second rotatable member, each of said leaf springs being provided with a hole at an end thereof, said armature plate being provided with pin-like projections at the axial end surface thereof, each of said pin-like projections being respectively fitted into the hole of each of said leaf springs and being press deformed at the projected end thereof to fixedly secure each of said leaf springs thereon.

4. The improvement as claimed in claim 3, wherein each of said pin-like projections is formed on one of said annular projections.

5. The improvement as claimed in claim 1 or 2, further comprising flexible means for joining said annular plate to said second rotatable member, said axial flexible means comprising leaf springs fixed to said armature plate, each of said leaf springs being provided with a hole at an end thereof, said second rotatable member being provided with a radial flange having projections axially extending in a direction opposite to said first rotatable member and with corresponding depressions in the opposite surface thereof, each of said projections of said radial flange having a flat end surface in which a hole is formed extending to the corresponding one of said depressions, each of said leaf springs being secured on each projection of said radial flange by fastening means extending through said holes of each of said leaf springs and of each projection of said radial flange.

6. The improvement as claimed in claim 3, wherein an additional opening is formed in each of said leaf springs at the opposite end thereof, said second rotatable member being provided with a radial flange having projections axially extending in a direction opposite to said first rotatable member and with corresponding depressions in the opposite surface thereof, each of said projections of said radial flange having a flat end surface in which a hole is formed extending to the corresponding one of said depressions, and means for securing said leaf springs on each projection of said radial flange, said securing means extending through said holes of each projection of said radial flange and through said additional opening of said leaf springs.

* * * * *